United States Patent [19]

Kasboske

[11] Patent Number: 4,972,301

[45] Date of Patent: Nov. 20, 1990

[54] VEHICLE LAMP WITH UNIVERSAL MOUNTING CAPABILITY

[76] Inventor: George C. Kasboske, 2820 N. Whipple, Chicago, Ill. 60618

[21] Appl. No.: 297,265

[22] Filed: Jan. 18, 1989

[51] Int. Cl.⁵ ............................................. B60Q 1/04
[52] U.S. Cl. ....................................... 362/61; 362/80; 362/367; 362/368; 362/371
[58] Field of Search ................. 362/61, 80, 80.1, 83.1, 362/83.3, 362, 368, 370, 371

[56] References Cited

U.S. PATENT DOCUMENTS

| | | | |
|---|---|---|---|
| 3,636,339 | 1/1972 | Osborne, Jr. | 362/362 |
| 4,488,206 | 12/1984 | Mizusawa | 362/80 |
| 4,628,415 | 12/1986 | Vescio et al. | 362/61 |
| 4,812,955 | 3/1989 | Beswick et al. | 362/61 |

FOREIGN PATENT DOCUMENTS

| | | | |
|---|---|---|---|
| 1916556 | 4/1969 | Fed. Rep. of Germany | 362/61 |
| 453694 | 9/1936 | United Kingdom | 362/61 |

Primary Examiner—Ira S. Lazarus
Assistant Examiner—Sue Hagarman
Attorney, Agent, or Firm—Wood, Phillips, Mason, Recktenwald & VanSanten

[57] ABSTRACT

A vehicle headlamp consisting of a casing containing an illumination source, a bracket for connection to a vehicle, and structure for selectively attaching the bracket to the casing at different locations on the casing to facilitate connection of the casing to various style vehicles. A vehicle headlamp consisting of an illumination source; a reflector for focusing light from the illumination source; a casing having first and second joinable parts; structure on the first and second casing parts for snap-fitting the first and second casing parts into assembled relationship; cooperating structure on the illumination source, reflector and first and second casing parts for maintaining the illumination source, reflector and casing in operative relationship with the first and second casing parts in assembled relationship and for permitting separation of the illumination source, reflector and casing upon the first and second casing parts being separated from each other.

29 Claims, 4 Drawing Sheets

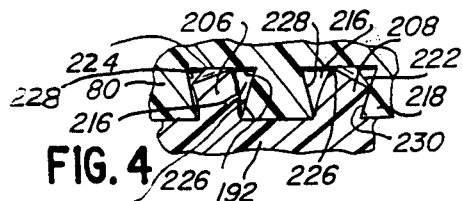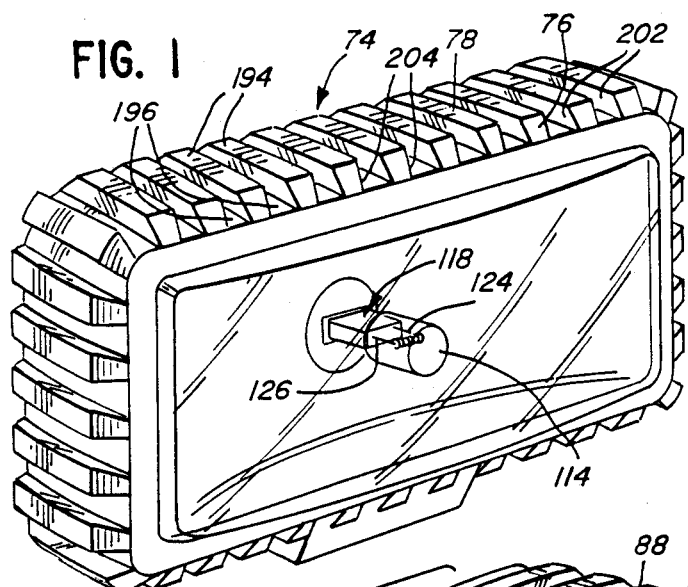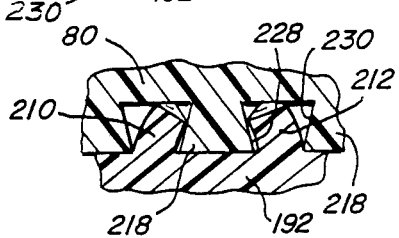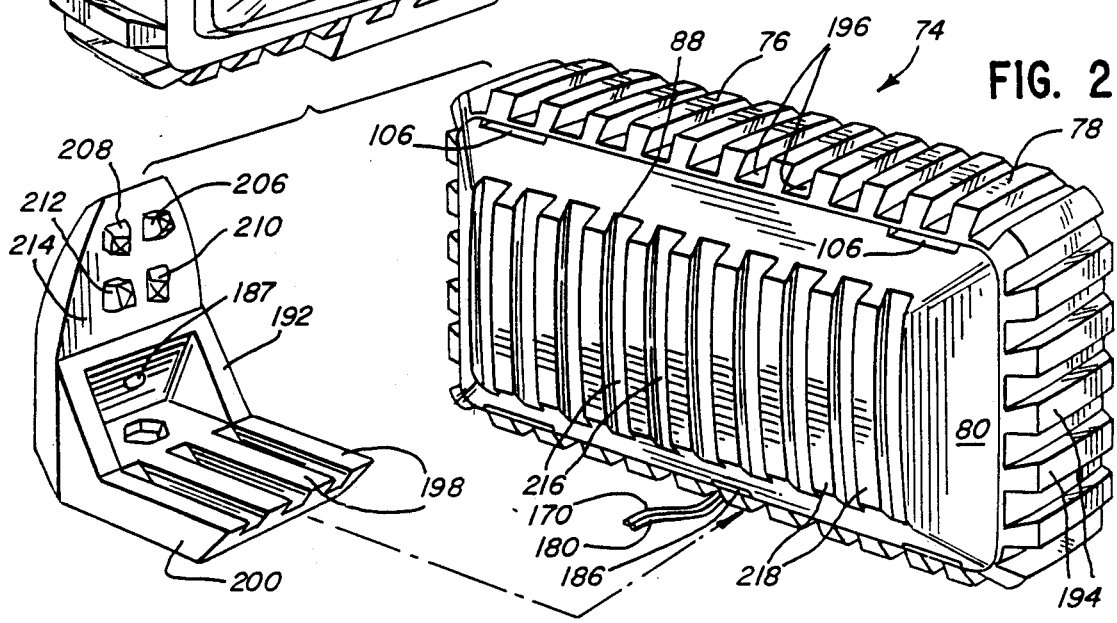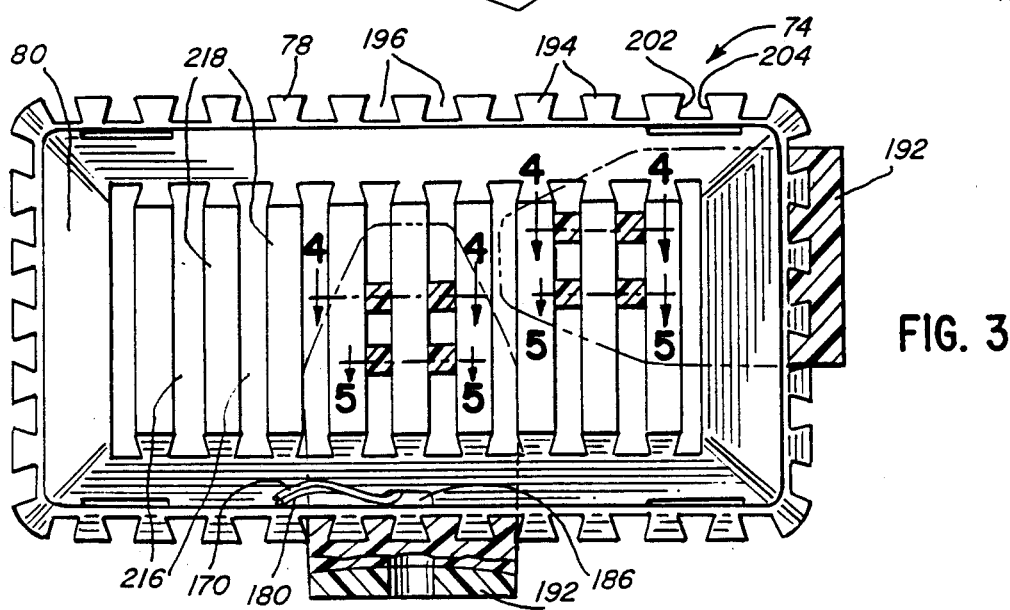

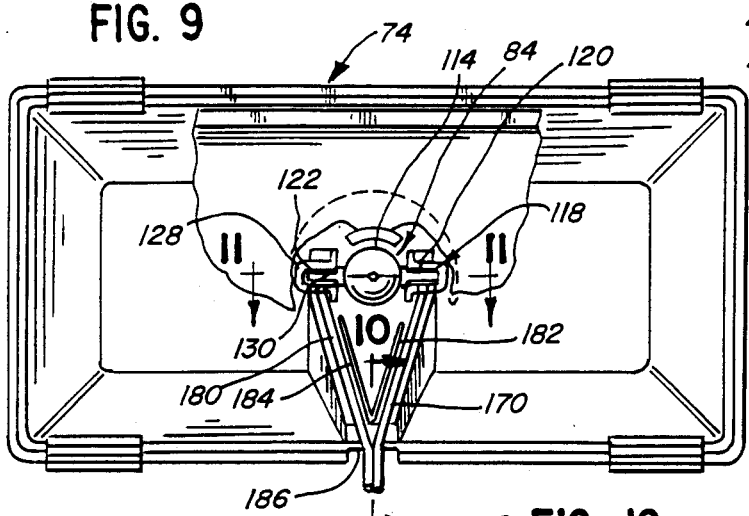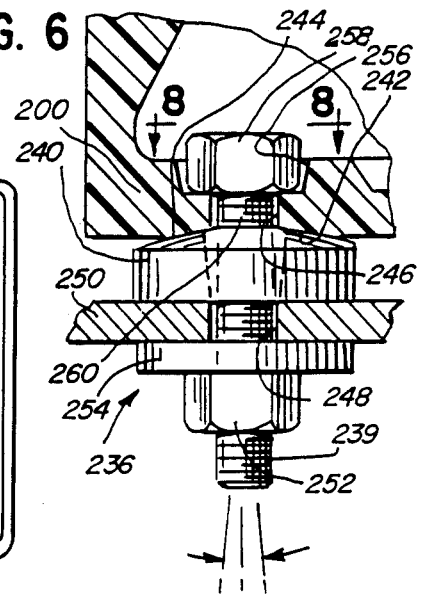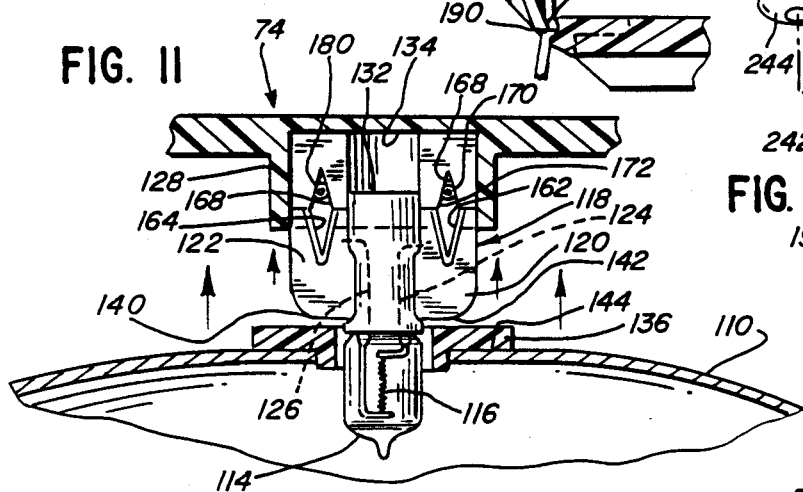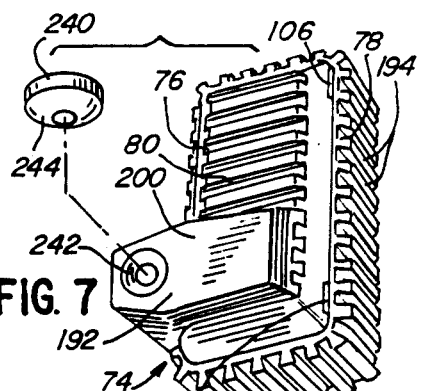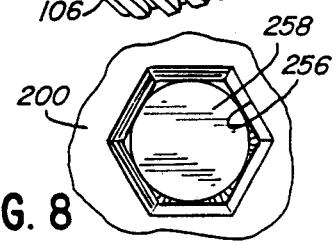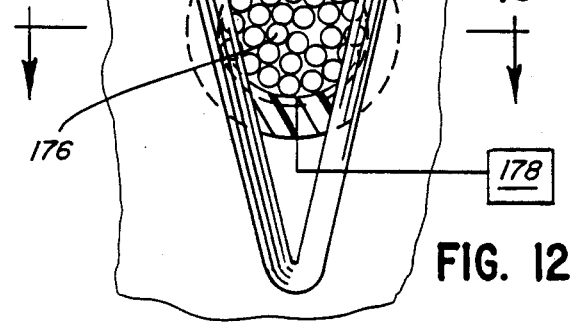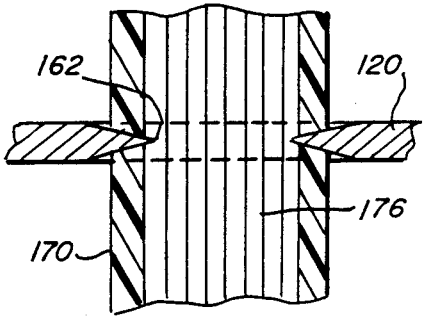

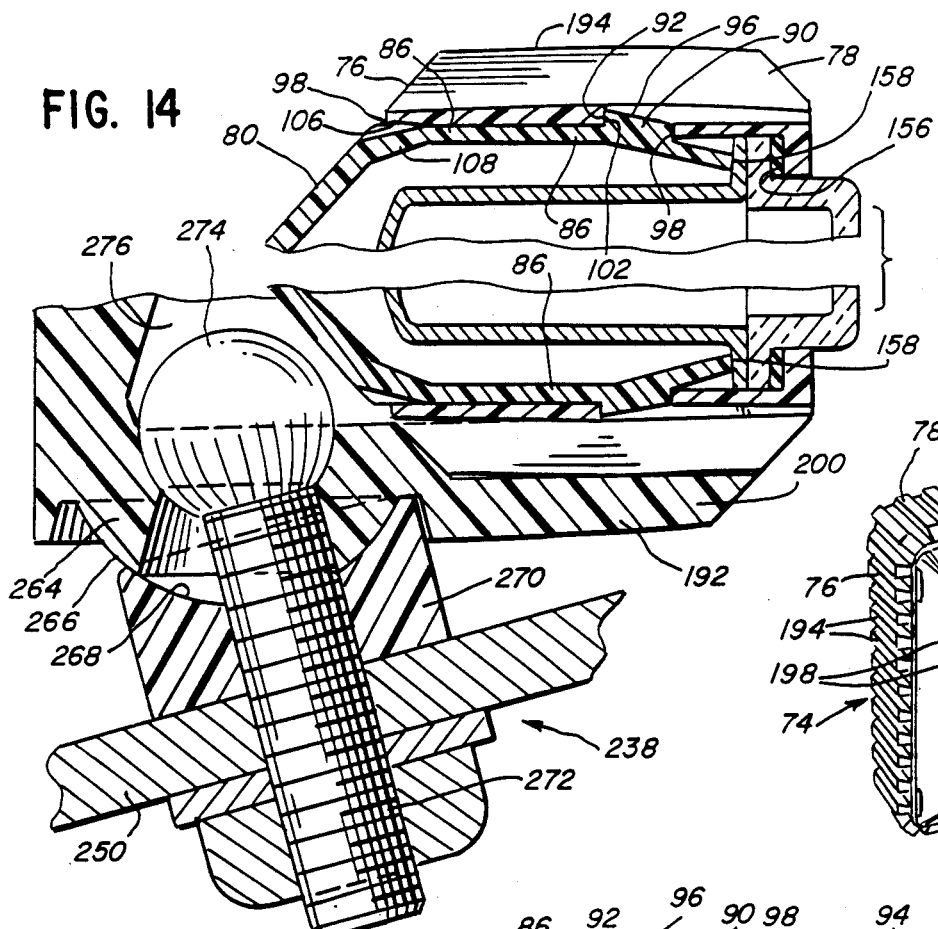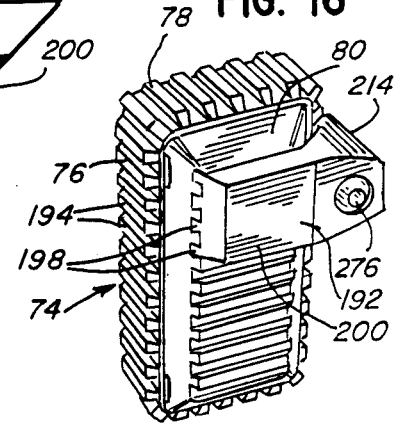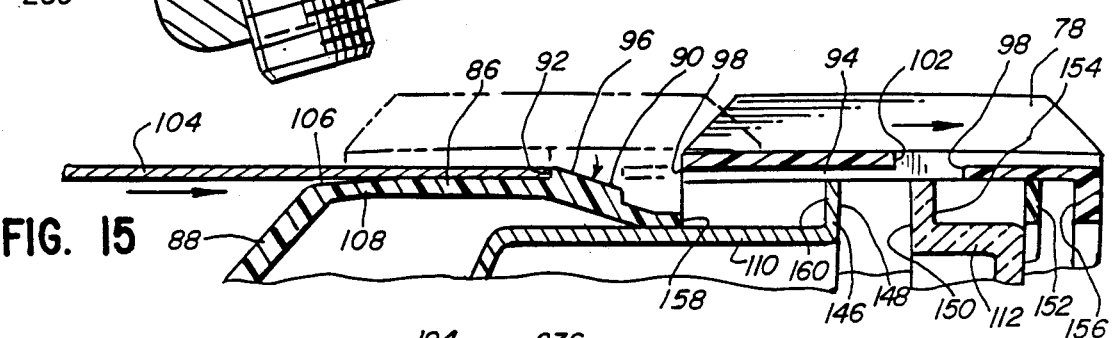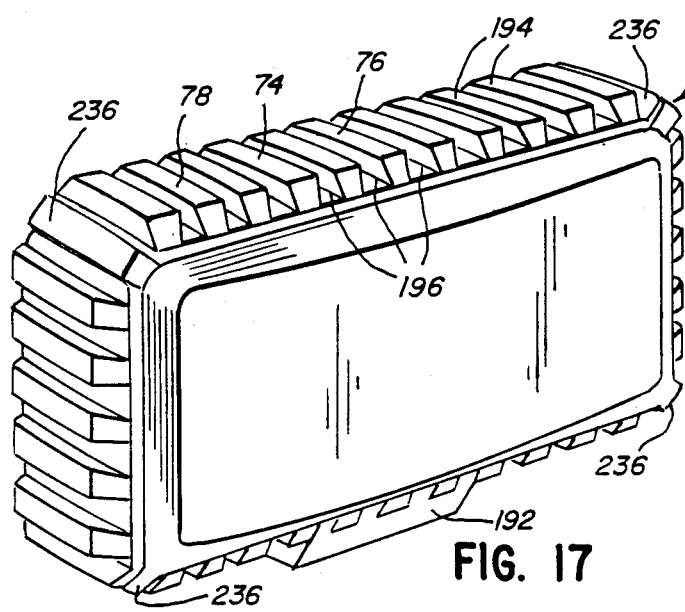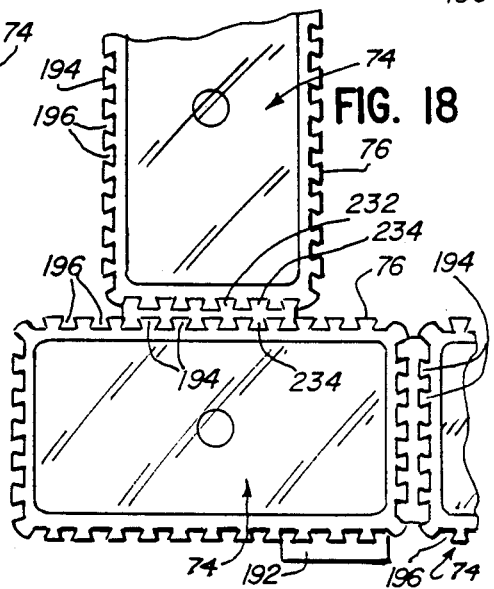

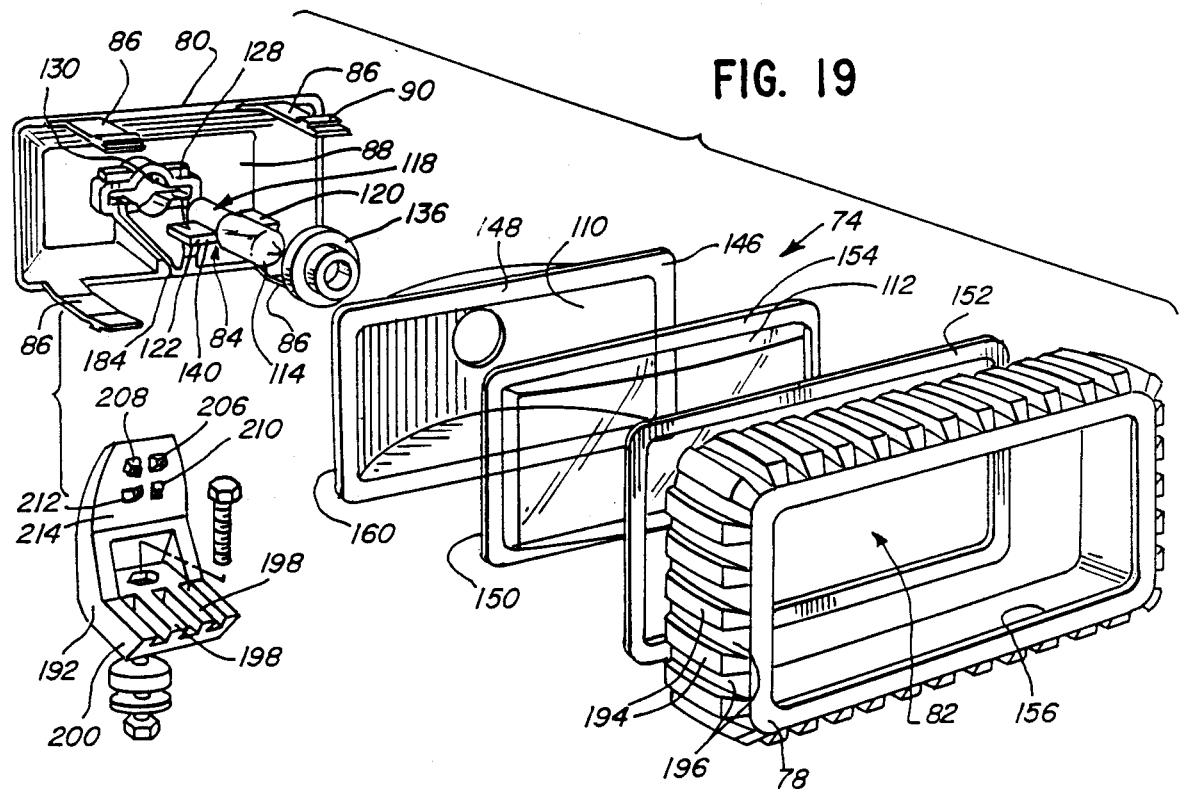

VEHICLE LAMP WITH UNIVERSAL MOUNTING CAPABILITY

BACKGROUND OF THE INVENTION

1. Field of the Invention

This invention relates to head-and-tail lamps, as used on on-road and off-road vehicles, and, more particularly, to a lamp that can be readily reconfigured to facilitate mounting on a variety of different vehicle styles. The invention also relates to a lamp with snap-fit casing parts wherein all elements of the lamp can be maintained captive in operative relationship by the snap-fit casing parts.

2. Background Art

Headlamps for moving vehicles generally consist of a casing, which contains an illumination source, and a bracket for attaching the casing to a vehicle. While conventional brackets permit angular adjustment of the casing on a vehicle to control the direction of light focus, these brackets are generally attached at a fixed, predetermined location on the casing. The result of this is that numerous different types of headlamps must be manufactured and inventoried to accommodate different on-road and off-road vehicles. For example, the headlamp mounting area on one vehicle may dictate that the bracket be situated, rather than centrally of the casing, to one side of the casing. If the headlamps are sold in pairs, those on the lefthand side of the vehicle must be manufactured differently than those on the righthand side of the vehicle. Thus, not only must manufacturers and distributors of such headlamps provide casings for different vehicles, but for each different vehicle there may be the need for two different casing configurations to accommodate the opposite vehicle sides.

Another problem with conventional headlamps is that they normally consist of numerous parts, which require intricate assembly. For example, one such conventional headlamp construction has an illumination source that is held in place on a reflector by wire clips. Fasteners are used to electrically connect wires from a power supply to the illumination source. Separate casing parts are then held together while screws/bolts are put in place to maintain the parts in operative relationship.

In the event that one desires to change the illumination source, the screws/bolts must be removed, the clips and connectors must be disconnected, and all parts must be kept available for reassembly. The complicated nature of such headlamps and the inconvenience of manufacturing and servicing the same is apparent.

Another problem with conventional headlamps is that they are heat sensitive. In operation, the illumination source produces considerable heat. The headlamp cases, which may be plastic, are susceptible to expansion, with the result often being that the various parts loosen or become misaligned.

SUMMARY OF THE INVENTION

The present invention is specifically directed to overcoming the above enumerated problems in a novel and simple manner.

According to the invention, a vehicle lamp is provided and consists of a casing containing an illumination source, a bracket for connection to a vehicle, and structure for selectively attaching the bracket to the casing at different locations on the casing to facilitate connection of the casing to various style vehicles It is a principal objective of the present invention to afford a lamp that is universal in nature. Because the bracket can be mounted at selected locations on the casing, a single lamp can be manufactured and reconfigured by an end user as a lefthanded and righthanded lamp, as well as for use on a number of different vehicle designs.

It is a further object of the present invention to provide a casing that is usable to construct either a headlamp or a taillamp. For simplicity herein, the invention will be described as a headlamp.

It is another object of the invention to facilitate attachment of the mounting bracket to the casing by providing structure for removably press fitting the bracket to the casing at different locations thereon.

More particularly, the attachment structure preferably consists of a plurality of elongate ribs on one of the casing and bracket and at least one keying element on the other of the casing and bracket. The bracket and casing are movable relative to each other lengthwise of the elongate ribs between (a) a release position, wherein the keying element is not engaged with the elongate ribs and (b) an attached position, wherein the keying element is meshed with adjacent elongate ribs on the one of the casing and bracket so as to maintain the bracket attached to the casing.

It is another object of the invention to securely maintain the bracket on the casing. Preferably, a plurality of keying elements are provided on the other of the casing and bracket and each keying element comprises an elongate rib, whereby there is substantial surface engagement between the casing and bracket and the development of substantial frictional forces which resist separation of the casing and bracket.

To further enhance the connection between the bracket and casing, the keying element(s) is guided in a slot defined between adjacent ribs by converging sides on adjacent elongate ribs. The keying element has a cross-sectional configuration closely matched to that of the slot within which it is received.

To still further enhance the connection between the bracket and casing, the elongate ribs can be made nonstraight so that the keying element binds as it is directed into its attached position.

In a preferred form, the casing has a front wall through which light from the illumination source projects, a rear wall and a continuous peripheral wall between the front and rear walls. The elongate ribs are on the peripheral wall and preferably entirely therearound so as to permit the keying element on the bracket to be engaged at desired locations around the entire periphery of the casing.

To further enhance the connection between the bracket and casing, there is structure on the bracket to snap connect the bracket to the rear wall of the casing with the keying element engaged with the ribs on the peripheral wall of the casing.

It is another object of the invention to further enhance the versatility of the light by permitting location of the bracket for mounting on both a vertically extending structure and a horizontally extending structure.

To permit this, elongate ribs are provided on the rear wall of the casing to cooperate with the keying element(s) on the bracket. The structure that snap connects to the rear wall, with the keying element on the bracket and the elongate ribs on the peripheral wall engaged, likewise snap-fits to the elongate ribs on the peripheral wall with the keying element engaged with the ribs on the casing rear wall.

In a preferred form, the bracket has transverse legs, one of which has a keying element(s) and the other of which has studs to selectively be snap-fit to the ribs on either the peripheral wall or those on the casing rear wall.

It is a further object of the invention to permit releasable joining of one casing to another casing having the same configuration.

To accomplish this end, a connector can be provided having oppositely projecting ribs for meshing with ribs on adjacent casings in the same fashion as the keying element(s) on the bracket engages the casing ribs. Alternatively, the ribs can be configured so that the casing ribs on adjacent casings directly mesh with each other.

Another object of the invention is to permit the headlamp to be mounted at selected locations along a bracket. For example, an elongate bracket can be mounted on a vehicle. One or more casings can be press-fit to the bracket, at selected locations using the cooperating arrangement of keying element(s) and ribs described above It is another object of the invention to maximize heat rejection from the casing. The elongate ribs, in addition to the bracket mounting function which they serve, also increase the exposed surface area of the casing to maximize heat rejection therefrom.

It is a further object of the present invention to permit adjustment of the casing to control the direction of light focus. In a preferred form, the headlamp bracket has a concave seat. An adjusting washer with a convex surface, for reception within the seat, is mounted on the vehicle. The casing is secured to the washer so that universal pivoting between the bracket and adjusting washer can be effected.

Alternatively, a conventional type ball and socket connection can be used to adjustably connect the bracket to a vehicle.

Further according to the invention, a vehicle headlamp is provided which consists of an illumination source; a reflector for focusing light from the illumination source; a casing having first and second joinable parts; structure on the first and second casing parts for snap-fitting the first and second casing parts into assembled relationship; cooperating structure on the illumination source, reflector and first and second casing parts for maintaining the illumination source, reflector and casing in operative relationship with the first and second casing parts in assembled relationship and for permitting separation of the illumination source, reflector and casing upon the first and second casing parts being disassembled from each other.

With the inventive structure, it is possible to altogether eliminate screws and bolts conventionally used to hold the illumination source and casing parts in assembled relationship. Screws and bolts, however, could be used, in conjunction with the inventive structure, to further secure the connection between the casing parts and the headlamp elements contained therewithin.

In a preferred form, the illumination source has a mounting portion with forwardly and rearwardly facing shoulders. The first casing part has a forwardly facing wall and the reflector has a rearwardly facing wall. With the first and second casing parts in assembled relationship, the mounting portion of the illumination source is held captively between the forwardly facing wall on the first casing part and the rearwardly facing wall on the reflector. The illumination source can be held in place entirely by the captive force generated between the first and second casing parts.

The snap-fitting structure preferably consists of a bendable leg on one of the first and second casing parts and having a shoulder facing in one direction, a shoulder on the other of the first and second casing parts and having a shoulder facing oppositely to the one direction, cooperating structure on the bendable leg and the other of the first and second casing parts for deflecting the leg in a first direction as the first and second casing parts are moved into assembled relationship and for permitting the leg to spring back oppositely to the first direction as the assembled relationship of the first and second casing parts is realized, so as to situate the shoulders on the bendable leg and the other of the first and second casing parts in facing relationship, to thereby prevent separation of the first and second casing parts from their assembled relationship.

To positively secure the headlamp elements in place, one or more resilient gasket/washers are provided. For example, a resilient washer can be interposed between the forwardly facing shoulder on the illumination source and a rearwardly facing surface on the reflector, which washer is dimensioned so that it is compressed between the illumination source and the reflector with the casing parts in assembled relationship. The compressed gasket maintains a bias on the illumination source so that positive positioning of the illumination source within the casing results.

Additional gaskets/washers can be provided on the reflector and/or other elements, which gaskets/washers, in addition to effecting positive connection between the headlamp elements, also creates a leakproof connection between the elements with which it is associated To further enhance the connection between the casing parts, preferably a plurality of bendable legs are provided, each operating in the same fashion as the bendable leg previously described It is a further object of the invention to facilitate disassembly of the casing parts. An opening is provided in the casing to permit access to the bendable leg with the casing parts in assembled relationship so that the bendable leg can be flexed to thereby move the shoulder thereon out of facing relationship with the shoulder on the casing so that the casing parts can be separated from each other.

It is a further object of the invention to facilitate electrical connection between a power source and the illumination source. Electrical connection is established with the illumination source with the inventive structure simply upon lead wires being placed in a predetermined orientation relative to one of the casing parts and the first and second casing parts being thereafter moved into assembled relationship. Preferably, an electrically conductive knife edge is provided on the illumination source in electrical contact with a filament associated with a bulb on the illumination source. The knife edge is configured and located so that upon the first and second casing parts being moved into assembled relationship, the knife edge severs the insulation on the wire lead to thereby establish electrical contact therewith It is another object of the invention to consistently maintain the wire leads in the predetermined orientation within the casing during assembly To accomplish this, guides for each casing are formed in the casing within which the wires can be conveniently placed for consistent orientation thereof in alignment for encounter with the knife edge upon the first and second casing parts being assembled.

To avoid shifting of the wire leads, one of the casing parts is provided with a projection and the other with a recess. The projection forces the wire lead into the recess so as to effectively crimp the wire to thereby prevent shifting of the wire relative to the casing upon the casing parts being moved into assembled relationship.

It is another aspect of the invention to afford a structure that has improved integrity at high temperatures.

The keying element(s) and elongate ribs are both preferably made from plastic. Under the influence of heat, the ribs and keying element(s) expand so that the meshed connection therebetween is strengthened.

Further, the bendable leg(s) has a forward free edge which, with the first and second casing parts in assembled relationship, bears biasably against a rearwardly facing surface on the reflector. Expansion of the case causes the free edge to bear more forcibly against the reflector.

To accommodate expansion and also provide a leak-proof seal between the headlamp elements, a gasket is interposed between the reflector, or a lens forwardly thereof, and a rearwardly facing surface on the casing against which the reflector and/or lens bears with the headlamp assembled. Under normal conditions, the gasket is slightly compressed under the force of the bendable leg so that residual forces in the gasket urge the reflector and lens into operative position and effect a seal therearound.

In its simplest state, the headlamp consists of an illumination source and the first and second casing parts, which captively hold the illumination source in operative relationship. For example, with the casing used as part of a taillamp, the reflector is optional The elements making up the headlamp can be consistently and simply assembled and positively maintained in their operative relationship. In the absence of special fasteners, such as screws and bolts, the headlamp can be simply disassembled by deforming the bendable leg(s) and separating the casing parts and the elements contained therewithin.

BRIEF DESCRIPTION OF THE DRAWINGS

FIG. 1 is a front perspective view of an assembled vehicle lamp according to the present invention;

FIG. 2 is a rear perspective view of the casing for the lamp in FIG. 1 with a mounting bracket therefor separated from the casing;

FIG. 3 is a rear elevation view of the lamp with the mounting bracket shown in two alternative positions on the casing;

FIG. 4 is a cross-sectional view of connecting structure between the casing and mounting bracket taken along line 4—4 of FIG. 3;

FIG. 5 is a cross-sectional view of connecting structure between the casing and mounting bracket taken along line 5—5 of FIG. 3;

FIG. 6 is an enlarged cross-sectional view of a mounting assembly for connecting the bracket to a vehicle;

FIG. 7 is a rear perspective view of the lamp with an adjusting washer on the mounting assembly in FIG. 6 separated from the mounting bracket;

FIG. 8 is a cross-sectional view of the bracket and mounting assembly taken along line 8—8 of FIG. 6;

FIG. 9 is a front elevation view of the lamp;

FIG. 10 is a cross-sectional view of the casing showing a wire retention structure thereon and taken along line 10—10 of FIG. 9;

FIG. 11 is an enlarged cross-sectional view of the lamp taken alone line 11—11 of FIG. 9;

FIG. 12 is an enlarged section view of a knife edge on the illumination source within the casing for establishing electrical connection with a wire lead;

FIG. 13 is a cross-sectional view of the knife edge and a wire lead engaged thereby and taken along line 13—13 of FIG. 12;

FIG. 14 is an enlarged section view of an alternative mounting assembly for the mounting bracket on the lamp;

FIG. 15 is an enlarged, fragmentary section view showing two joinable parts making up the lamp casing and partially separated from their assembled relationship;

FIG. 16 is a rear perspective view of the lamp with the mounting assembly of FIG. 14;

FIG. 17 is a front perspective view of a modified form of the the lamp according to the invention;

FIG. 18 is a front perspective view showing a plurality of the lamp casings assembled to each other;

FIG. 19 is an exploded perspective view of the vehicle lamp with the mounting assembly of FIG. 6; and FIG. 20 is an exploded perspective view of a prior art vehicle headlamp

DETAILED DESCRIPTION OF THE DRAWINGS

In FIG. 20, a prior art vehicle headlamp is shown at 10. The headlamp 10 consists of a casing 12 with joinable front and rear parts 14, 16, respectively. The casing parts 14, 16 cooperatively bound a space 18 in which an illumination source at 20 is contained. The illumination source 20 consists of a conventional style bulb 22 with a mounting base 24 fixedly attached thereto. The bulb 22 has a filament 26, which is supplied by a conventional power supply 27 through wire leads 28, 30.

With the headlamp 10 assembled, the bulb 22 projects forwardly through an opening 32 in a reflector 34, which has a forwardly facing parabolic surface 36 to focus light from the bulb 22 in a predetermined manner. A protective lens 38 covers the reflector 34. The reflector 34 and lens 38 are maintained in operative relationship captively between the casing parts 14, 16.

To assemble the headlamp 10, the illumination source 20 is first attached to the reflector 34. To accomplish this, a cup-shaped socket 40 is directed forwardly through the reflector opening 32 and pre-assembled with the reflector 34. Commonly the securing is accomplished by bending over tabs (not shown) or the like on the reflector 34 to embrace radially extending flanges 42 on the socket 40. The illumination source 20 is directed into the socket 40 so that the bulb 22 projects through a square cutout 44 in the front of the socket 40. Forward movement of the illumination source 20 is limited by an enlarged disk 46 at the rear end of the illumination source, which abuts a stop (not shown) on the socket 40. A resilient, U-shaped clip 48 is then attached to the socket 40 to maintain the illumination source 20 within the socket 40.

Thereafter, the reflector 34 with the attached bulb 22 is held in close proximity to the rear casing part 16 so that the leads 28, 30 can be individually attached to the illumination source 20 to power the bulb 22 from the supply 27. The leads 28, 30 are attached to the illumination source 20 through conventional connectors 50, 52.

Once the wire leads 28, 30 are connected, the reflector 34 is directed rearwardly into the space 18 defined by the rear casing part 16. The lens 38 is then placed over the reflector 34 and in turn the front casing part 14 is placed against the reflector 34 and attached to the rear casing part 16. The front casing part 14 has a peripheral rim 54 which is configured to match the forward peripheral wall 56 in the rear casing part 16, and when assembled thereto, closely surrounds the peripheral wall 56. Screws 58 are then directed through the rim 54 and casing part 16 and into nuts 59 to thereby maintain the casing parts 14, 16 in assembled relationship.

To mount the headlamp 10 to a vehicle, a mounting assembly at 60 is provided. The mounting assembly 60 consists of a boss 62 integrally formed with the bottom wall 64 of the casing part 16. The boss 62 is received in a U-shaped bracket 66. A bolt (not shown) is directed through the boss 62 and the surrounding legs 68, 70 on the bracket 66 so that the casing 12 can pivot about a horizontal, laterally extending axis relative to the bracket 66. The bracket 66 is fixedly secured, as by a bolt 72, to a vehicle.

The prior art device in FIG. 20 has several drawbacks. One problem is that the boss 62, by reason of its being integrally formed with the casing 16, is immovable. Consequently, the bracket 66 is capable of being attached at only one position on the casing 12. If there is not enough room on the vehicle on either side of the boss 62 to accommodate the casing 12, a casing having a different configuration must be utilized. The present invention obviates this problem. Further, the number of parts required is significantly greater than that in the inventive structure described below.

In FIGS. 1-19, a preferred form of the lamp, according to the present invention, is shown at 74. As earlier mentioned, the inventive structure is usable to construct a lamp that is usable on a vehicle at the front thereof as a headlamp, at the rear thereof as a taillamp, or elsewhere on the vehicle. For simplicity, the lamp 74 will be described herein as a headlamp. The headlamp 74, according to the present invention, consists of a casing 76 having joinable front and rear casing parts, 78, 80 respectively, which are shown most clearly in FIG. 19. The front casing part 78 is a rectangular frame which bounds an opening 82 through which light from an illumination source at 84 projects. The rectangular configuration for the headlamp 74 is only exemplary and other configurations, such as square, circular, etc., are all comprehended by the invention.

The front casing part 78 is releasably joinable to the casing part 80 through four bendable legs 86, projecting forwardly in cantilever fashion from a rear wall 88 on the casing part 80. It is not necessary that there be four such bendable legs 86. Each leg 86 has an enlargement 90 intermediate its length defining a rearwardly facing shoulder 92. The front casing part 78 has slots 94 integrally formed therein with a width slightly greater than the legs 86 to guide fore and aft movement of the legs 86 relative to the front casing part 78.

In their relaxed state, the upper legs 86, on the rear casing part 80, project slightly upwardly and the lower legs 86, on the rear casing part 80, project slightly downwardly so that the upper and lower legs 86 must be compressed towards each other to pass into the front casing part opening 82 and the guide slots 94 therefor.

To effect progressive deformation of the legs 86 during assembly, the enlargement 90 on each leg 86 is provided with a ramp surface 96, which is intercepted by the rear corner 98 of the front casing part 78.

To effect assembly of the casing 76, the front and rear casing parts 78, 80 are aligned so that the legs 86 are presented at the ends of their respective slots 94. The casing parts 78, 80 are then moved against each other until the assembled relationship of FIG. 14 is realized. With the casing parts 78, 80 in assembled relationship, the enlargements 90 on the legs 86 align in a fore and aft direction with receptive openings 98 in the front casing part 78. As this occurs, the residual forces in the deformed legs 86 cause the legs 86 to spring back into the openings 98 so that the rearwardly facing shoulder 92 on each leg 86 is placed in facing relationship with a forwardly facing shoulder 102 on the front casing part 78 bounding the opening 98. The facing shoulders 92, 102 interfere with each other to prevent the casing parts 78, 80 from being disassembled.

To disassemble the casing parts, a flat strip 104 of relatively rigid material, sized to slide within the slots 94, is employed. As can be seen in FIG. 14, which shows the casing parts 78, 80 in assembled relationship, an opening 106 is maintained in the casing 76 between the front casing part 78 and an offset 108 on each leg 86 to facilitate entry of the strip 104. By directing the strip 104 through the opening 106 in FIG. 14, the leg 86 is progressively deflected downwardly. The thickness of the strip 104 is chosen so that with the strip 104 inserted into the slot 94 between the leg 86 and casing part 78, the enlargement 90 is deflected downwardly sufficiently that the shoulder 92 thereon clears the shoulder 102 on the casing part 78. The casing parts 78, 80 are then freely separable from each other.

The casing parts 78, 80 maintain the illumination source 84, a reflector 110 and a lens 112 captively in operative relationship. While it is possible, according to the invention, to use separate fasteners such as bolts, screws, etc., with the inventive structure such extra fasteners can be eliminated altogether.

The illumination source 84 consists of a bulb 114 with a conventional filament 116. The bulb 114 has a mounting portion 118 with oppositely projecting flat metal blades 120, 122. One lead 124 from the filament 116 is connected to the blade 120, while the other lead 126 from the filament 116 is connected to the blade 122. Any number of wire leads can be provided depending on the construction of the bulb 114.

The rear casing part 80 has an integrally formed boss 128 that defines a seat 130 having a configuration to closely match the cross section of the mounting portion 118 of the illumination source 84. With the illumination source 84 directed into the seat 130, a rearwardly facing shoulder 132 on the illumination source 84 abuts a forwardly facing surface 134 on the rear wall 88 of the rear casing part 80.

A gasket 136 surrounds the bulb 114 on the illumination source 84 and resides between forwardly facing shoulders 140, 142 on the illumination source blades 120, 122 and a rearwardly facing surface 144 on the reflector 110.

The reflector 110 has a peripheral flange 146 with a forwardly facing flat surface 148 against which a flat, rearwardly facing surface 150 on the lens 112 facially abuts. A resilient gasket 152 resides between a forwardly facing surface 154 on the lens 112 and a rearwardly facing shoulder 156 on the front casing part 78.

With the casing parts 78, 80 in assembled relationship, a forwardly facing free edge 158 on each bendable leg 86 bears forwardly on a rearwardly facing surface 160 on the reflector 110 and thereby urges the reflector 110, the lens 112 and the gasket 152 against the shoulder 156 on the casing part 78. The length of the legs 86 is chosen so that the reflector 110, lens 112 and gasket 152 are positively squeezed against the casing shoulder 156 by the legs 86. The gasket 152 is compressed to permit the shoulder 92 on the enlargement 90 on each leg 86 to move into the casing opening 98. The residual forces in the gasket 152 thus bias the shoulder 92 against the casing shoulder 102. The gasket 152 also leakproofs the connection between the lens 112 and casing part 78. The gasket 136 compresses upon the casing parts 78, 80 realizing their assembled relationship and there is resultingly a residual rearward force imparted by the gasket 136 on the illumination source 84 to positively seat the illumination source 84 in proper operative relationship with the remainder of the headlamp elements It can be seen that the illumination source 84, reflector 110, lens 112 and casing parts 78, 80 are, through the inventive structure, consistently, positively held together in operative relationship without the need for separate fasteners. Upon the legs 86 being released and the casing parts 78, 80 separated, one from the other, the illumination source 84, reflector 110 and lens 112 can be readily separated from each other and the casing parts 78, 80 to facilitate repair and/or replacement A further advantage of the inventive structure is that expansion of parts due to heating from the illumination source 84 results in the headlamp 74 being held more positively in assembled relationship, whereas the integrity of the prior art device in FIG. 20, under the influence of heat, may be compromised. Preferably, the casing parts 78, 80 are molded from plastic. Upon the legs 86 and gaskets 136, 152 expanding under the influence of heat, the result is that the reflector 110 and lens 112 become effectively squeezed more tightly between the casing shoulder 156 and the free end 158 of the legs 86. Further, the enlargement 90 can be dimensioned so that expansion thereof results in each enlargement 90 binding tightly in a casing opening 98.

A further aspect of the invention is the provision of structure to facilitate electrical connection of the illumination source 84. Each of the blades 120, 122 on the illumination source 84 has a knife edge, 162, 164 respectively. Representative knife edge 162 will be described herein with reference to FIGS. 11-13.

The knife edge 162 is provided on a V-shaped cut-out 166 in the blade 120. The cutout 166 opens rearwardly and cooperates with a V-shaped cutout 168 in the boss 128, which cutout 168 opens forwardly. During assembly the free end of a lead wire 170 is nested in the cutout 168 in the boss 128. Upon the illumination source 84 being moved rearwardly from the FIG. 11 position relative to the rear casing part 80, the lead wire 170 becomes squeezed between the edge 172 defining the cutout 168 and the knife edge 162 The cutouts 166, 168 are configured so that upon the shoulder 132 on the illumination source 84 abutting the casing surface 134, the lead wire 170 is forced against the knife edge 162 to the position shown in FIGS. 12 and 13. In this position, the insulation layer 174 is severed by the knife edge 162, which establishes electrical contact with wire strands 176 making up the wire 170. Because the knife edge 162 and the blade 120 are both conductive, electrical connection is established between the wire lead 170 and the lead 124 connecting to the filament 116. The lead 170 is conventionally connected to a power source, shown schematically at 178 in FIG. 12. The lead 180 is connected to the blade 122 and filament lead 126 in like fashion through the knife edge 164.

With the inventive structure, the assembler need only direct the free ends of the wire leads 170, 180, with the insulation intact, through the cutouts 168 in the boss 128 and thereafter snap together the casing parts 78, 80. The need for stripping the wires 170, 180 and/or attaching connectors is obviated.

To maintain a consistent, predetermined orientation of the wires 170, 180 within the casing 76, guide slots 182, 184 are formed therein for reception of the wire leads 170, 180. As shown in FIG. 9, the guide slots 182, 184 provide a divergent seat for the leads 170, 180 which can be directed upwardly through an opening 186 in the bottom of the casing 76 into the slots 182, 184.

To prevent shifting of the wires 170, 180 in the slots 182, 184, a projection 188 (FIG. 10) is provided on the rear casing part 80 and a receptive recess 190 is provided in the front casing part 78. Upon the casing parts 78, 80 being joined, with the wire leads 170, 180 in their respective guide slots 182, 184, the projection 188 crimps the wires 170, 180 against the recess 190 so that shifting of the wires 170, 180 relative to the casing 76 is prevented.

With the inventive structure, assembly can proceed as follows. The assembler places the illumination source 84 in the boss 128, directs the leads 170, 180 through the guide slots 182, 184 and the cutouts 168, attaches the gasket 136 over the bulb 114 and thereafter consecutively assembles against the gasket 136 the reflector 110, the lens 112, the gasket 152 and the front casing part 78, with the legs 86 on the rear casing part 80 aligned with their respective guide slots 94 in the front casing part 78. By then squeezing the casing parts 78, 80 towards each other, the knife edges 162, 164 sever the insulation on the wires 170, 180 to thereby connect the power supply 178 to the illumination source 84 and the illumination source 84, gasket 136, reflector 110, lens 112 and gasket 152 are all held in operative relationship compressibly, captively between the casing parts 78, 80. By releasing the legs 86, all of the headlamp parts are readily separable for replacement and/or repair.

Another aspect of the invention is the provision of a universal lamp structure for mounting to a vehicle. The casing 76 is mounted to a vehicle through an L-shaped bracket 192. The bracket 192 is arranged to be snap-fit in any selected location around the entire periphery of the casing 76, in a manner as shown for the brackets 192 in FIG. 3. An optional opening 187 (FIG. 2) is provided in the bracket 192 to accommodate the wires 170, 180 with the bracket 192 mounted to the casing 76 in the vicinity of the casing opening 186.

The front casing part 78 has a plurality of equidistantly spaced, elongate ribs 194, extending in a fore and aft direction about the periphery of the front casing part 78. Adjacent ribs 194 define guide slots 196 for keying elements 198 on one leg 200 of the bracket 192. The keying elements 198 are shown as four elongate rails, however only one such keying element 198 is necessary and it need not be elongate, as the depicted keying elements 198. By making the keying elements 198 elongate, the bracket 192 is more positively held on the casing 12 by reason of the increased engaged surface area between the casing 76 and bracket 192.

The cross section of the keying elements 198 is closely matched to the cross section of the slots 196 defined by adjacent ribs 194 on the casing part 78. As shown clearly in FIG. 3, adjacent ribs 194 have non-parallel surfaces 202, 204 which cooperatively define the slots 196. In a preferred form, the surfaces 202, 204 diverge towards the bottom of the slots 196 so that the keying elements 198 are locked against other than lengthwise movement relative to the ribs 194.

To assemble the bracket 192, the keying elements 198 are aligned at the desired location on the casing 12 with slots 196. The bracket 192 is then pushed forwardly relative to the casing 76 to force the keying elements 198 between the ribs 194. As the keying elements 198 and ribs 194 progressively overlap, the friction forces therebetween are increased. To further secure the connection between the mounting bracket 192 and casing 12, the ribs 194, as shown clearly in FIGS. 14 and 17, are slightly bowed. The binding force between the ribs 194 and keying elements 198 is thereby enhanced. Further, as the casing 76 is heated in use the ribs 194 and keying elements 198 expand so that the ribs 194 and keying elements 198 more positively embrace each other.

Upon the bracket 192 being pressed fully forwardly into its attached position, a plurality of studs 206, 208, 210, 212, on a leg 214 of the mounting bracket 192 transverse to the leg 200, snap into slots 216 defined by equidistantly spaced elongate ribs 218 on the rear wall 88 of the rear casing part 80. As shown in FIG. 4, two of the studs 206, 208 are formed in a diverging orientation with respect to each other. Upon the bracket 192 being pressed forwardly, a nose 222 on the stud 208 cams the stud 208 towards the stud 206 to permit its entry into one of the slots 216. Similarly, a nose 224 on the stud 206 deflects the stud 206 towards the stud 208 to permit its entry into a slot 216. With the bracket 192 in its fully forward position relative to the casing 76, the noses 222, 224 on the studs 206, 208 abut the surface 226 at the bottom of the slots 216. The studs 206, 208 assume their undeformed state and thereby frictionally bear against the side walls 228, 230 on spaced ribs 218 defining the slots 216.

As shown in FIG. 5, two of the studs 210, 212 on the bracket leg 214 are urged away from each other upon encountering a rib 218 during assembly and spring back upon entering into the slots 216 to cooperatively embrace one of the ribs 218. The studs 206, 208, 210, 212 on the bracket leg 214 simultaneously snap into assembled relationship and cooperatively securely hold the bracket leg 214 against the rear wall 88 of the casing 76.

The ribs 218 on the rear casing wall 88 are configured and spaced the same as the ribs 194 on the front casing part 78. This arrangement permits the keying elements 198 on the bracket 192 to be passed into the slots 216 between adjacent ribs 218 on the casing rear wall 88 and the studs 206, 208, 210, 212 to be snap-fit into the slots 196 between adjacent ribs 194 on the periphery of the casing 76. The leg 200 on the bracket 192, which is the leg that attaches to a vehicle, can thus be situated anywhere along the rear of the casing as well as on any of the four sides of the casing periphery. To change the location of the bracket 192 on the casing 76, one need only snap off the bracket 192 and reposition it by snap-fitting on the casing 12, at a desired location.

The invention also contemplates that the casing 76 be releasably attached to one or more casings 76 of like configuration. As shown in FIG. 18, any number of casings 76 can be assembled. To effect this assembly, a connecting element 232 is provided. The connecting element 232 has oppositely projecting keying elements 234 which are press fit into the slots 196 on the casings 76 between adjacent ribs 194 in similar fashion as the keying elements 198 on the mounting bracket 192. FIG. 18 shows but one exemplary arrangement of the casings 76. The mounting bracket 192 is connectable to any one of the casings 76 in the manner previously described.

As an alternative to using the connecting element 232, the ribs 194 on adjacent casings 76 can be directly intermeshed. This is made possible by shortening the ribs 236 on the corners of the casing 76, as shown in FIG. 17.

It is also possible with the inventive structure to provide an elongate bracket 192 with keying elements 198 therealong to which one or more of the casings 76 can be selectively engaged.

To connect the headlamp 10 to a vehicle, the bracket leg 200 is used. Two different exemplary mounting assemblies are shown—one in FIGS. 6–8 and 19 at 236 and the other in FIGS. 14 and 16 at 238.

The mounting assembly 236 in FIGS. 6–8 and 19 consists of a mounting bolt 239 and an adjusting washer 240. The bracket leg 200 has a concave seat 242 for reception of a convex surface 244 on one side of the adjusting washer 240. The bolt 239 extends downwardly through a bore 246 in the mounting leg 200, through the washer 240 and a bore 248 in a vehicle mounting base 250 and is secured by a nut 252. A washer 254 is interposed between the mounting base 250 and nut 252 and has burrs, serrations, or the like (not shown) to cause the washer 254 to grip the mounting base 240.

The mounting leg 200 has a seat 256 that is configured to be loosely keyed to tighten and the hexagonal bolt head 258, thereby making it possible to tighten and loosen the nut 252 without manually holding the bolt head 258. The bolt shaft 260 is loosely received in the bore 246 so as permit the mounting leg 200 to pivot universally against the convex washer surface 244 so as to focus the light from the illumination source 84 where desired. With the casing 76 adjusted as desired, the nut 252 can be tightened, which thereby causes the bolt head 258 to draw the concave surface 242 of the mounting leg 200 tightly and fixedly against the convex surface 244 of the washer 240.

The mounting assembly 238 in FIGS. 14 and 16 consists of a boss 264 on the bracket leg 200 with a convex surface 266 for reception in a concave surface 268 defined by a lug 270 conventionally secured to the vehicle mounting base 250. The mounting base 250 has an associated shaft 272 with a ball 274 on the end thereof that is conventionally snapped into a receptive socket 276 on the bracket 192.

With each of the mounting assemblies 236, 238, the bracket 192 can be assembled at a desired location and universally pivoted relative to the vehicle to which it attaches to effect a desired light focus.

The foregoing disclosure of specific embodiments is intended to be illustrative of the broad concepts comprehended by the invention.

What is claimed is:

1. A vehicle lamp comprising:
a casing containing an illumination source;
a bracket for connection to a vehicle in a fixed mounting position thereon; and cooperating means on the casing and bracket for fixedly attaching the casing to the bracket in its fixed mounting position so that the bracket can be fixedly engaged at different locations on the casing to facilitate connection of the casing to various style vehicles and placement of the casing in different orientations on a single vehicle.

2. The vehicle lamp according to claim 1 wherein the attaching means comprises means for removably press fitting the bracket to the casing at at least three different locations on the casing.

3. The vehicle lamp according to claim 1 wherein the attaching means comprises a plurality of elongate ribs on one of the casing and bracket and at least one keying element on the other of the casing and bracket, said bracket and casing being movable lengthwise of the elongate ribs relative to each other between (a) a release position wherein the keying element is not engaged with the elongate ribs and (b) an attached position wherein the keying element is meshed with adjacent elongate ribs on the one of the casing and bracket so as to maintain the bracket attached to the casing.

4. The vehicle lamp according to claim 3 wherein there are a plurality of keying elements on the other of the casing and bracket and the keying elements each comprise an elongate rib.

5. The vehicle lamp according to claim 1 wherein means are provided for joining the casing to another casing the same as the first claimed casing.

6. The vehicle lamp according to claim 5 wherein the joining means comprises a connector and means are provided for releasably press fitting the connector to each of the first claimed and said another casing.

7. The vehicle lamp according to claim 5 wherein the joining means comprises a plurality of elongate ribs on each of the first claimed and said another casing and the casings are joined directly to each other by releasably intermeshing the ribs on the first claimed and said another casing.

8. The vehicle lamp comprising:
a casing containing an illumination source;
a bracket for connection to a vehicle; and
means for selectively attaching the bracket to the casing at different locations on the casing to facilitate connection of the casing to various style vehicles,
wherein the attaching means comprises a plurality of elongate ribs on one of the casing and bracket and at least one keying element on the other of the casing and bracket, said bracket and casing being movable lengthwise of the elongate ribs relative to each other between a release position wherein the keying element is not engaged with the elongate ribs and an attached position wherein the keying element is meshed with adjacent elongate ribs on the one of the casing and bracket so as to maintain the bracket attached to the casing,
wherein there is a slot between adjacent elongate ribs within which the keying element is guided an the slot is defined by first and second converging surfaces on adjacent elongate ribs.

9. A vehicle lamp comprising:
a casing containing an illumination source;
a bracket for connection to a vehicle; and
means for selectively attaching the bracket to the casing at different locations on the casing to facilitate connection of the casing to various style vehicles,
wherein the attaching means comprises a plurality of elongate ribs on one of the casing and bracket and at least one keying element on the other of the casing and bracket, said bracket and casing being movable lengthwise of the elongate ribs relative to each other between a release position wherein the keying element is not engaged with the elongate ribs and an attached position wherein the keying element is meshed with adjacent elongate ribs on the one of the casing and bracket so as to maintain the bracket attached to the casing,
wherein there are first and second slots between first and second pairs of adjacent elongate ribs at first and second locations on said one of the casing and bracket, said first slot is defined by converging surfaces on the first pair of adjacent elongate ribs at the first location and said second slot is defined by converging surfaces on the second pair of adjacent elongate ribs at the second location, each said slot having an open end to admit the keying element during assembly of the casing and bracket, said open ends of the slots having a configuration matched to that of the keying element to guidingly accept the keying element for movement lengthwise of the ribs, there being cooperating means on the adjacent elongate ribs at each of the first and second locations on said one of the casing and bracket for binding with the keying element as the casing and bracket are moved between said release position and said attached position.

10. The vehicle lamp according to claim 9 wherein said binding means comprises a non-straight portion of said adjacent ribs that frictionally grips the keying element moved therebetween in the transition from said release position to said attached position.

11. A vehicle lamp comprising:
a casing containing an illumination source;
a bracket for connection to a vehicle; and
means for selectively attaching the bracket to the casing at different locations on the casing to facilitate connecting of the casing to various style vehicle,
wherein the attaching means comprises a plurality of elongate ribs on one of the casing and bracket and at least one keying element on the other of the casing and bracket, said bracket and casing being movable lengthwise of the elongate ribs relative to each other between (a) a release position wherein the keying element is not engaged with the elongate ribs and (b) an attached position wherein the keying element is meshed with adjacent elongate ribs on the one of the casing and bracket so as to maintain the bracket attached to the casing,
wherein said casing has a front wall from which light from the illumination source projects, a rear wall and a continuous peripheral wall between the front and rear walls, the elongate ribs are on the peripheral wall and there are cooperating means on the casing rear wall and bracket for maintaining the casing and bracket in the attached position.

12. The vehicle lamp according to claim 11 wherein the cooperating means in the casing rear wall and bracket comprise snap-fit means.

13. The vehicle lamp according to claim 12 wherein the cooperating means on the casing rear wall and bracket comprises a plurality of elongate ribs on one of the casing rear wall and bracket and a stud on the other of the casing rear wall and bracket, said stud being snap-fit between adjacent elongate ribs on the casing rear wall.

14. The vehicle lamp according to claim 13 wherein there are a plurality of studs and a first and second of the studs are deformable and are moved away from each other by one rib on the rear wall as the bracket and casing are moved towards said attached position and spring back and cooperatively embrace the one rib with the attached position realized.

15. The vehicle lamp according to claim 13 wherein there are a plurality of studs and a first and second of the studs are deformable and moved towards each other by first and second ribs on the rear wall as the bracket and casing are moved towards said attached position and spring back and are biased away from each other and against said first and second ribs on the rear wall with the attached position realized.

16. The vehicle lamp according to claim 11 wherein the cooperating means on the casing rear wall and bracket for maintaining the casing and bracket in the attached position comprises a plurality of elongate ribs on the rear wall and means on the bracket for snap connecting the bracket to the ribs on the rear wall, the keying element is on the bracket and movable between a release position and an attached position in mesh selectively with the ribs on the peripheral wall and ribs on the rear wall and with the keying element in mesh with the ribs on the peripheral casing wall the snap connecting means on the bracket snap connects to at least one rib on the rear wall and with the keying element in mesh with the ribs on the rear casing wall the snap connecting means on the bracket snap connects to at least one rib on the peripheral casing wall.

17. A vehicle lamp comprising:
   a casing containing an illumination source and having a front wall through which light from the illumination source projects, a rear wall and a peripheral wall between the from and rear wall and having first and second oppositely facing wall pairs;
   a bracket having first and second transverse legs, one of the transverse legs being adapted for fixed connection to a vehicle to which the headlamp is to be attached in a mounting position; and
   cooperating means for removably fixedly attaching the casing to the bracket in its mounting position so that the bracket engages different locations on the casing to facilitate connection of the bracket to various vehicle styles and placement of the casing in different orientations on a single vehicle.

18. The vehicle lamp according to claim 17 wherein the attaching means comprises a plurality of elongate ribs on at least two of said casing walls and a keying element on one leg of the bracket to cooperate with said ribs whereby the casing and bracket are movable relative to each other lengthwise of said ribs between (a) a release position wherein the keying element is not engaged with the elongate ribs and (b) an attached position wherein the keying element is meshed with adjacent elongate ribs on the casing, and cooperating means on the other leg of the bracket and casing for maintaining the bracket in the attached position.

19. The vehicle lamp according to claim 18 wherein there are a plurality of ribs for cooperating with the keying element on each of the walls in the facing casing wall pairs.

20. The vehicle lamp according to claim 17 wherein means are provided for joining the casing to another casing the same as the first claimed casing.

21. The vehicle lamp according to claim 18 wherein said elongate ribs on the casing walls extend continuously around the first and second oppositely facing wall pairs, said ribs being exposed to the atmosphere to enhance heat dissipation from said casing.

22. The vehicle lamp according to claim 17 wherein said one transverse bracket leg has a concave seat to receive a mounting element on a vehicle to which the vehicle headlamp is connected.

23. The vehicle lamp according to claim 22 in combination with an adjusting washer, said adjusting washer having a convex surface matched to the concave seat in the one transverse bracket leg for reception in the concave seat to permit universal relative pivoting movement between the bracket and the adjusting washer.

24. The vehicle lamp according to claim 17 in combination with means for adjustably attaching the one transverse bracket leg to a vehicle so that the headlamp can be repositioned with respect to a vehicle to which the headlamp is attached to achieve a desired focus of light from the illumination source in the casing.

25. A vehicle lamp comprising:
   a casing containing an illumination source and having a front wall from which light through the illumination source projects, a rear wall and a squared peripheral wall between the front and rear wall and having first and second oppositely facing wall pairs;
   a bracket having first and second transverse legs, one of the transverse legs being adapted for connection to a vehicle to which the headlamp is to be attached; and
   means for selectively removably attaching the bracket to the casing at different locations on the casing to facilitate connection of the bracket to various vehicle styles,
   wherein the attaching means comprises a plurality of elongate ribs on at least two of said casing walls and a keying element on one leg of the bracket to cooperate with said ribs whereby the casing and bracket are movable relative to each other lengthwise of said ribs between (a) a release position wherein the keying element is not engaged with the elongate ribs and (b) an attached position wherein the keying element is meshed with adjacent elongate ribs on the casing, and cooperating means on the other leg of the bracket and casing for maintaining the bracket int he attached position,
   wherein there are a plurality of ribs on at least the casing rear wall and one of the walls of the facing wall pairs and the keying element on the one bracket leg is selectively engagable with the ribs on the one of the walls of the facing wall pairs and the rear wall and with the keying element engaged with the ribs on the one of the walls of the facing wall pairs the cooperating means on the other bracket leg engages the ribs on the rear wall and with the keying element engaged with the ribs on the rear wall the cooperating means on the other bracket leg engages the ribs on the one of the walls of the facing wall pairs to maintain the bracket attached to the casing.

26. A vehicle lamp comprising:
   a casing containing an illumination source;
   a bracket for connection to a vehicle; and
   means for selectively attaching the casing to the bracket into an operative position on the bracket, by relative sliding movement of said bracket and casing against each other substantially in a line, said attaching means including interlocking means for preventing the casing from separating from its operative position and the bracket other than by effecting relative movement of said casing and bracket along said line, said attaching means further including means for selectively attaching the casing to the bracket at at least first and second locations spaced from each other transversely of said line.

27. The vehicle lamp according to claim 26 wherein the attaching means comprises a keying element on one of the casing and bracket and a plurality of elongate slots on the other of the casing and bracket and extending substantially parallel to the line.

28. The vehicle lamp according to claim 26 wherein said interlocking means further includes means for preventing the casing from separating from its operative position int he bracket by other than relative movement between said casing and bracket along said line that is reversed from that relative movement used to effect attachment of the casing to the bracket.

29. A vehicle lamp comprising:

a casing containing an illumination source and having a front wall through which light from the illumination source projects, a rear wall and a peripheral wall between the front and rear wall and having first and second oppositely facing wall pairs;

a bracket having first and second transverse legs, one of the transverse legs being adapted for connection to a vehicle to which the headlamp is to be attached; and means for selectively attaching the bracket to the casing at different locations on the casing, said attaching means including means for releasably connecting the first leg with one of the wall of the first and second wall pairs and the second leg with the rear wall to facilitate connection of the bracket to various vehicle styles and placement of the casing in different orientations on a single vehicle.

* * * * *